United States Patent [19]
Rogers

[11] Patent Number: 6,118,583
[45] Date of Patent: *Sep. 12, 2000

[54] OPTICAL IMAGING SYSTEM

[75] Inventor: Philip Rogers, Bodelwyddan, United Kingdom

[73] Assignee: Pilkington PE Limited, Clwyd, United Kingdom

[ * ] Notice: This patent is subject to a terminal disclaimer.

[21] Appl. No.: 09/082,838

[22] Filed: May 21, 1998

[30] Foreign Application Priority Data

Jun. 2, 1997 [GB] United Kingdom ............... 9711366

[51] Int. Cl.[7] .......................... G03B 13/06; G03B 17/00
[52] U.S. Cl. ...................... 359/432; 359/353; 359/365; 359/421
[58] Field of Search .................... 359/350–359, 359/362, 364–366, 431–433, 726–733, 856–861

[56] References Cited

U.S. PATENT DOCUMENTS

| | | | |
|---|---|---|---|
| 4,861,148 | 8/1989 | Sato et al. .............. | 359/365 |
| 4,877,317 | 10/1989 | Gibbons et al. .......... | 359/421 |
| 5,004,331 | 4/1991 | Haseltine et al ......... | 359/858 |
| 5,044,706 | 9/1991 | Chen .................... | 359/357 |
| 5,113,281 | 5/1992 | Mandelboum et al. ...... | 359/365 |
| 5,136,422 | 8/1992 | Ukon .................... | 359/351 |
| 5,153,772 | 10/1992 | Kathman et al. .......... | 359/365 |
| 5,161,051 | 11/1992 | Whitney et al. .......... | 359/351 |
| 5,202,792 | 4/1993 | Rollin .................. | 359/356 |
| 5,287,218 | 2/1994 | Chen .................... | 359/365 |
| 5,386,316 | 1/1995 | Cook .................... | 359/365 |
| 5,969,860 | 10/1999 | Mearns .................. | 359/432 |

FOREIGN PATENT DOCUMENTS

| | | | |
|---|---|---|---|
| 0 051 970 A1 | 5/1982 | European Pat. Off. . | |
| 51969 | 5/1982 | European Pat. Off. ..... | 359/356 |
| 2 136 149 | 9/1984 | United Kingdom . | |

*Primary Examiner*—Thong Nguyen
*Attorney, Agent, or Firm*—Alston & Bird LLP

[57] ABSTRACT

A two-stage optical imaging system which is capable of operating in the infra red and which is compact, the system comprising an objective generally in the form of a Cassegrain system with primary and secondary mirrors A, B together with a relay C which may be reflective, refractive or refractive and diffractive, the relay C being located co-axially between the primary and secondary mirrors A, B.

6 Claims, 8 Drawing Sheets

OPTICAL IMAGING SYSTEM

FIELD OF THE INVENTION

This invention relates to optical systems and in particular to optical imaging systems which are capable of operating in the infrared waveband.

In a number of applications it is desirable to have an optical imaging system which is capable of operating in the infrared waveband and which is of short physical length in comparison with focal length, for example physical length being of the order of 20or 30% of focal length. However, in infrared waveband systems, stray thermal radiation is a problem and it is therefore convenient to form the imaging system as a two-stage optic having an intermediate image at which a field stop is located to thereby obviate or mitigate the effects of stray radiation. Unfortunately two-stage optics, comprising an objective and a relay, heightens the difficulty of achieving a compact system which has good optical properties.

OBJECT AND SUMMARY OF THE INVENTION

It is an object of the present invention to provide new and improved forms of two-stage optical imaging systems which are capable of operating in the infrared waveband and which are compact.

The present invention provides a two-stage optical imaging system which is capable of operating in the infra red and which is compact, the system comprising an objective generally in the form of a Cassegrain system with primary and secondary mirrors together with a relay which may be reflective, refractive or refractive and diffractive, the relay being located co-axially between the primary and secondary mirrors.

In one embodiment according to the present invention the optical imaging system comprises an objective and a relay aligned on a common optical axis, the objective being arranged to form an intermediate image at which a field stop is located, and wherein the objective is formed by a large concave primary mirror which is apertured on-axis and a small secondary mirror generally disposed in the form of a Cassegrain objective, and the relay is formed by a pair of confronting mirrors each being apertured on-axis to enable the output to the relay to reach the focal plane.

Within what is included herein as being 'Cassegrain' the secondary mirror of the objective may be generally planar or it may be convex. Furthermore, mirrors which are said to be 'apertured' may be provided either by a substrate with a hole or opening or by a substrate which is transmissive to radiation in the relevant waveband at the location of the 'aperture'.

The relay mirrors are preferably concave but the relay mirror which is proximal to the objective secondary mirror may be generally planar to ensure that the focal plane is suitable remote from the relay so that a cooled detector system can be fitted.

In a modification, the system is rendered dual field by the introduction of an axially movably alternative concave primary mirror which is apertured on-axis but which is of smaller diameter than the said large concave primary mirror, the alternative primary mirror being moveable between an out-of-use position which is generally aligned with the small secondary mirror of the objective and an in-use position intermediate the large concave primary mirror and the secondary concave mirror where it has the dual function of (i) co-operating with the secondary mirror to form a wide angle objective and (ii) blocking radiation directed from the large concave primary mirror.

By virtue of the fact that the optical components are mirrors they may be made from a material such as aluminium which is the same as or which has the same coefficient of thermal expansion as that forming the housing and support structure for the system so that the system is inherently athermalized. Furthermore such mirrors are capable of operating on a multi-waveband basis so that the system is inherently multi-waveband.

Due to the fact that the alternative primary mirror is a moveable component it may be desirable to fabricate it in a lightweight material such as plastic (with a reflective coating) to facilitate its movement.

The imaging system may be utilized behind a window for the purpose of protecting the imaging system from abrasive incidents. The window may be planar but in the event that the window is curved it thereby imposes unwanted optical power on the incident radiation, the effects of which may be compensated for by converting any one of the mirrors of the imaging system to a Mangin mirror. The Mangin mirror is preferably one of the mirrors of the relay. In the case of a curved and therefore powered window, and where an alternative primary mirror is provided in order to render the system dual field, the alternative primary mirror may be a Mangin component in order to achieve full chromatic and thermal compensation for the powered window in the wide angle mode although in many cases this will not be necessary.

In another embodiment according to the present invention the optical imaging system comprises an objective and a relay aligned on a common optical axis, the objective being arranged to form an intermediate image at which a field stop is located, and wherein the objective is formed by a large concave primary mirror which is apertured on-axis and a small secondary mirror generally disposed in the form of a Cassegrain objective, the relay is formed by a refracting lens, and the system is rendered dual field by the introduction of an axially-moveable alternative concave primary mirror which is apertured on-axis but which is of smaller diameter than the said large concave primary mirror, the alternative primary mirror being moveable between an out-of-use position which is generally aligned with the small secondary mirror of the objective and an in-use position intermediate the large concave primary mirror and the secondary mirror where it has the dual function of (i) co-operating with the secondary mirror to form a wide angle objective and (ii) blocking radiation directed from the large concave primary mirror.

The secondary mirror of the objective may be generally planar or it may be convex.

In a further embodiment according to the present invention the optical imaging system comprises an objective and a relay aligned on a common optical axis, the objective being arranged to form an intermediate image at which a field stop is located, and wherein the objective is formed by a large concave primary mirror which is apertured on-axis and a small secondary mirror generally disposed in the form of a Cassegrain objective, and the relay is formed by a plurality of refractive lens elements of which at least one lens element is positively powered and has a relatively low γ value (γ being the thermal 'glass' constant), and at least one of the lens elements incorporates a diffractive surface, the arrangement being such that the relay is essentially fully achromatized and is athermalized with respect to the housing material forming the housing of the imaging system.

Conveniently at least another lens element is negatively powered and has a relatively high γ value.

The diffractive surface may be carried on any one of the two surfaces of any one of the lens elements but preferably is not carried on that lens element surface which is closest to the intermediate image. The principal purpose of the diffractive surface is to eliminate chromatic aberration, however, it also enables use of low γ materials. The analytical method for deriving the power of the diffractive surface follows that described in Chapter 39 of the 'Handbook of Optics' (Second Edition) published by the Optical Society of America.

It will be understood that the thermal 'glass' constant γ represents the thermal power change of the optical material from which the lens element is formed normalised to unit power and unit change of temperature (as is explained in Chapter 39 of the 'Optical Society of America Handbook of Optics' published by McGraw - Hill, 1995).

Preferably also the low γ value and the high γ value lens elements are configured substantially to eliminate thermal defocus to thereby provide full athermalisation.

Preferably the low γ value lens elements are made of zinc sulphide or AMTIR-1, the high γ value lens elements are made of semi-conductor materials such as germanium and gallium arsenide. High γ values are typically greater than $0.50\times10^{-4}$ units whereas low γ values are typically less than that figure.

Preferably the lens elements made of semi-conductor materials incorporate the diffractive surface.

By virtue of the further embodiment chromatic aberration can be obviated or substantially mitigated in a largely fully athermalised system whilst maintaining refractive optics in the relay whereby obscuration is avoided.

In a modification the system is rendered dual field by the introduction by an axially moveable alternative concave primary mirror which is apertured on-axis but which is of smaller diameter than the said large concave primary mirror, the alternative primary mirror being moveable between an out-of-use position which is generally aligned with the small secondary mirror of the objective and an in-use position intermediate the large concave primary mirror and the secondary mirror where it has the dual function of (i) co-operating with the secondary mirror to form a wide angle objective and (ii) blocking radiation directed from the large concave primary mirror.

Each of the embodiments may be utilized behind a window for the purpose of protecting the imaging system from abrasive incidents. The window may be planar but in the event that the window is curved it thereby imposes unwanted optical power on the incident radiation, the effects of which may be compensated for, for example if the relay is reflective one of the mirrors of the imaging system may be converted to a Mangin mirror. The Mangin mirror is preferably the small secondary mirror of the objective but alternatively it may be the alternative primary mirror where that is provided If the relay is refractive the compensation is easily achieved within the relay.

Also, in each of the embodiments the imaging system may be operated with a detector system or with alternative detector systems which are sensitive in the visible waveband and/or in any of the infrared wavebands and/or the transmissive millimetric waveband. The detector system may be formed by a single set of detector elements which are dual or multi waveband sensitive or by plural sets of detector elements which individually are single waveband sensitive (in which case a waveband sensitive fold mirror may be required). Thus, the system operates in the millimetric part of the spectrum (specifically in the narrow atmospheric transmission band around a wavelength of 3 mm) in addition, and simultaneous with if required, the wavebands of visible, 3–5 μm infrared and 8–12 μm infrared. This is achieved in exactly the same manner as for the other bands when the optical material used in the Mangin mirror (and the powered external window/dome) transmits in the millimetric waveband—which is the case for multispectral zinc suphide. Known antireflection coatings can be employed on refracting surfaces but, in addition to these, provision can be made for an antireflection effect at the millimetric wavelength by choosing a thickness for Mangin (and window/dome) such that the optical pathlength through this thickness is a small odd integer multiplication of the millimetric wavelength. Such a thickness will result in reflections at front and rear surfaces that are in antiphase with each other and thus will destructively interfere producing an antireflection effect.

BRIEF DESCRIPTION OF THE DRAWINGS

Embodiments of the present invention will now be described by way of example with reference to the accompanying drawings in each of which only a limited number of optical rays are depicted, in the interests of clarity, and in which.

DETAILED DESCRIPTION OF THE PREFERRED EMBODIMENTS

Figure 1:
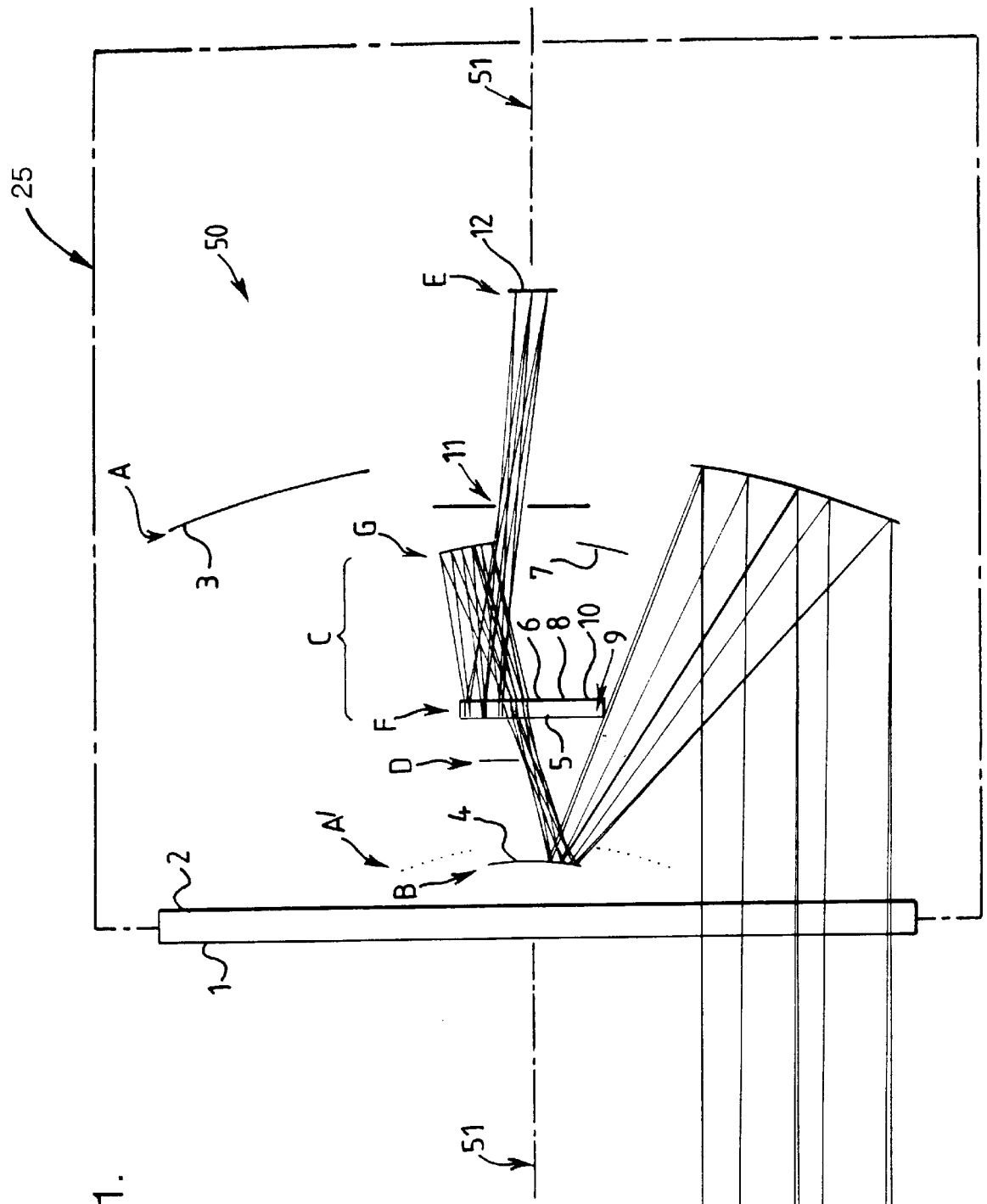
FIG. 1 illustrates a first embodiment incorporating a powered window and which is dual field of view, shown in its narrow angle setting.
Figure 2:
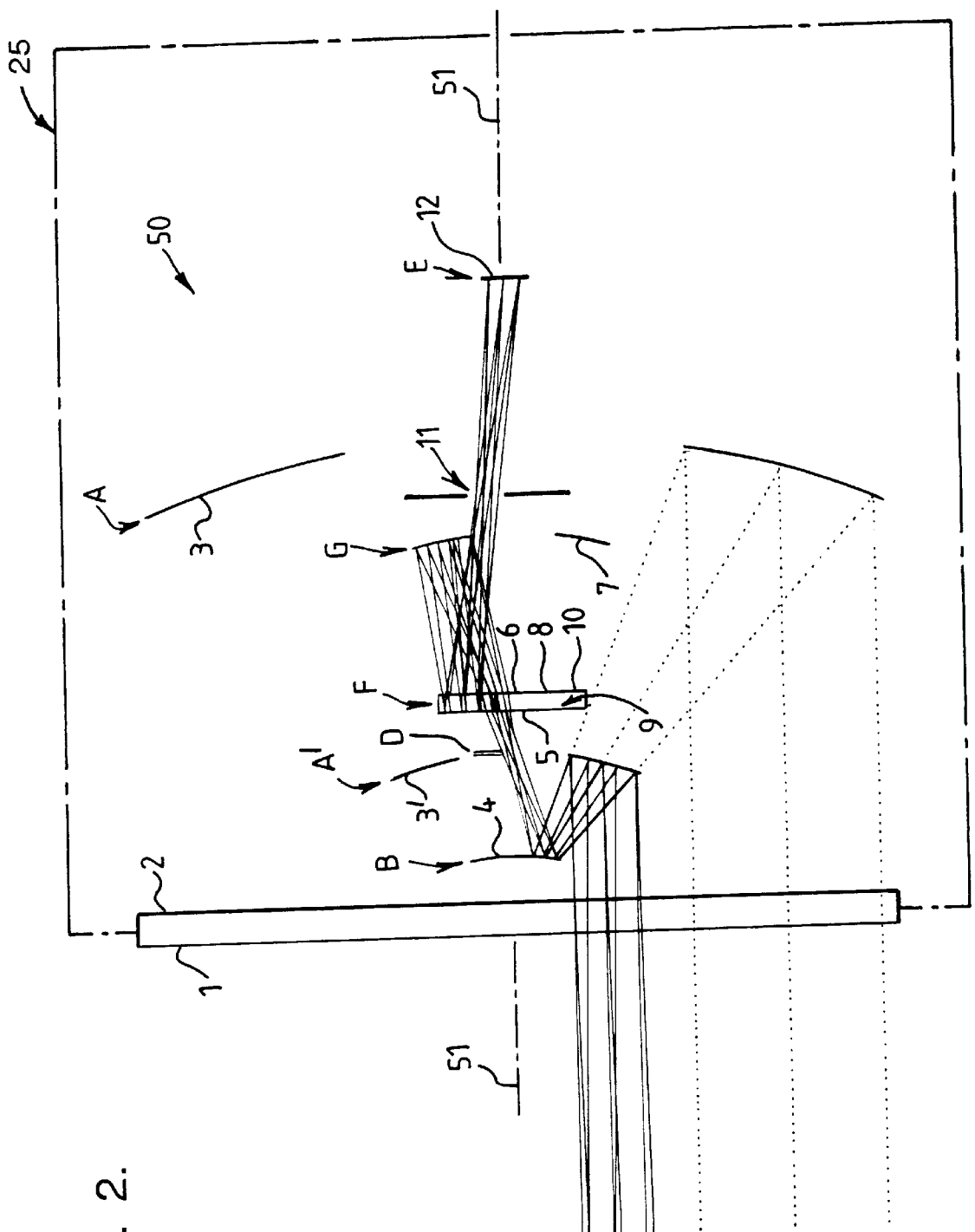
FIG. 2 illustrates the system of FIG. 1 in its wide angle setting.

The optical imaging system 50 illustrated in FIGS. 1 and 2 is mounted in a housing 25 as schematically illustrated in the drawings and comprises an objective formed by separated mirrors A,B generally disposed in the form of a Cassegrain objective which forms an intermediate image at which a field stop D is located and a relay C which forms a final image at a focal plane E. The system 50 is symmetrical about its optical axis 51 and in the interests of clarity only those rays are illustrated which are incident on the objective and initially lie below axis 51 (in FIG. 1). It will, however, be understood that there is a similar set of rays not shown which lie above axis 51.

Mirror A is a large diameter concave primary mirror which is apertured on axis and has a reflective surface 3 to redirect incident rays towards mirror B which is a small secondary mirror with reflective surface 4. Rays reflected by surface 4 pass through an on axis aperture of mirror element F to be reflected by the reflecting surface 7 of mirror element G. Mirrors elements F and G together form the relay C and have confronting (ie face to face) reflective surfaces 7,9. In FIG. 1 mirror element F is in fact a Mangin mirror which will be explained below. The rays which are reflected from surface 7 of mirror element G are reflected from reflective surface 9 and are redirected through an on axis aperture in mirror element G via an aperture stop 11 to form the final image 12 at the focal plane E.

Mirror B may be generally planar or it may be convex (as shown in FIG. 1). Reflective surface 7 is preferably concave but surface 9 may be of low curvature, either convex or concave, ie generally planar to cause focal plane E to be sufficiently distant from the mirror element G to enable a cooled detector system to be fitted around the final image 12. Such a system will usually also incorporate provision for an aperture stop.

The relay C is located co-axially between the objective primary mirror A and the secondary mirror B so as to render the system extremely compact.

In FIG. 1 the system 50 is utilized behind a powered window having refractive surfaces 1,2 which impose unwanted optical power on the incident radiation. The effects of this unwanted optical power are compensated for by making mirror element F a Mangin mirror. Thus the reflective surface 9 is carried by an optically powered substrate having two physical surfaces which are traversed four times by the radiation and are denoted as effective surfaces 5,6,8 and 10.

The system 50 is rendered dual field by the provision of an axially movable alterative concave primary mirror $A^1$. In FIG. 1 the system 50 has mirror $A^1$ in an out of use position (which is generally aligned with mirror B) so that a narrow field of view is achieved. However, in FIG. 2 the mirror $A^1$ has been moved away from mirror B towards the relay C into such a position that its reflecting surface $3^1$ has the function of co-operating with mirror B whilst the rear surface of mirror $A^1$ blocks radiation reaching mirror B from the principal objective mirror A. This arrangement provides a wide angle setting for the system 50.

A specific functional design for the system 50 is set forth in Table I hereto which tabulates surfaces 1 to 12 of FIG. 1, the radius of curvature of each surface, the successive on axis separation of successive surfaces, and the nature of the material used to provide the surface. Thus by way of example surface 2 is provided by zinc sulphide, is plano, and is located 1.3431 units distant from surface 1 in the direction of the final image 12, while surface 4 is convex, slightly aspheric, and located 17.2597 units from surface 3 but in the direction away from the final image 12. The aspheric surfaces are configured according to the standard equation given in Table I and with the coefficients E, $a^4$ and $a^6$ having the values specific for a particular surface number. By way of example, for surface 3 (NA) coefficient $a^6$ has a value of 7.5018E-10 which is the standard fashion in the art of writing the numeric value of $7.5108 \times 10^{-10}$. Table I also provides data for the FIG. 2 setting where surface $3^1$ is used instead of surface 3.

Figure 3:
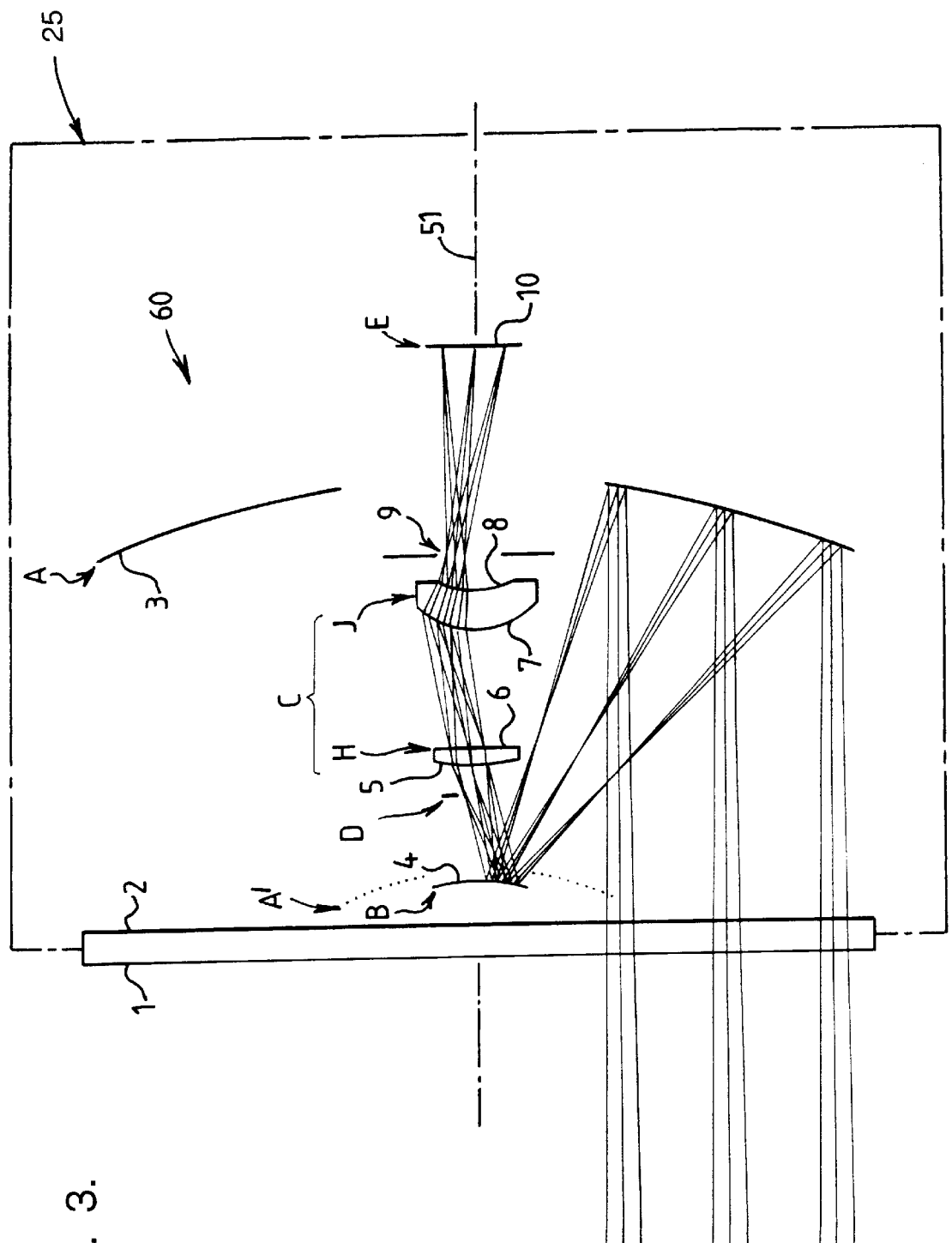
FIG. 3 illustrates a second embodiment incorporating an unpowered window and which is dual field of view, shown in its narrow angle setting.
Figure 4:
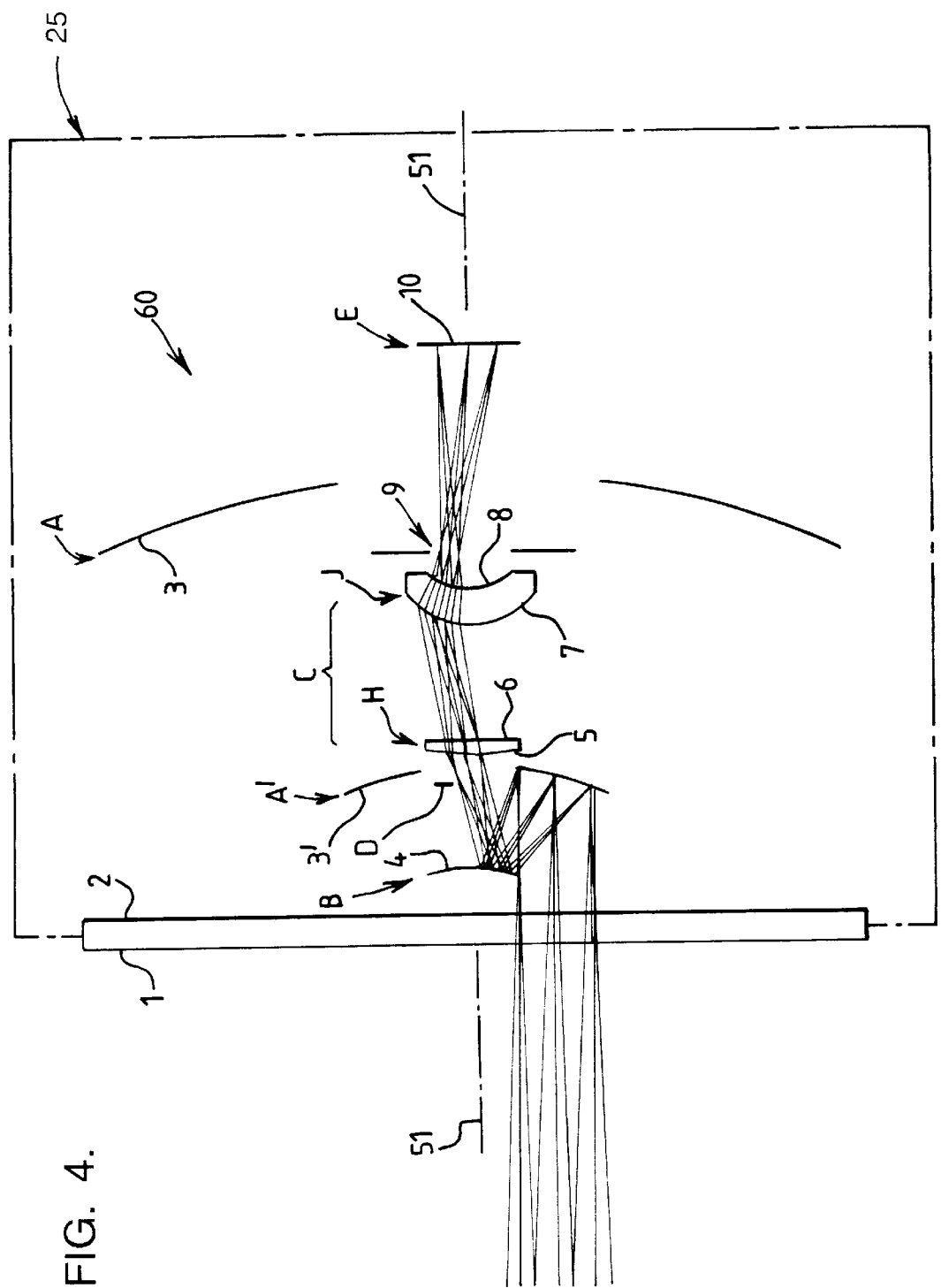
FIG. 4 illustrates the system of FIG. 3 in its wide angle setting.

The system 60 which is illustrated in FIGS. 3 and 4 is generally similar to the system 50 of FIGS. 1 and 2 but instead of the relay C incorporating mirrors the system 60 has its relay C formed by spaced lens elements H,J which reduce obscuration. Additionally, the window is planar and unpowered. A specific functional design for the system 60 is set forth in Table II hereto. The format of Table II is the same as for Table I and the successive effective surfaces of the elements are identified numerically in FIGS. 3 and 4. It will be noted that the surface numbers of the system 60 are not the same as those of the system 50.

Figure 5:
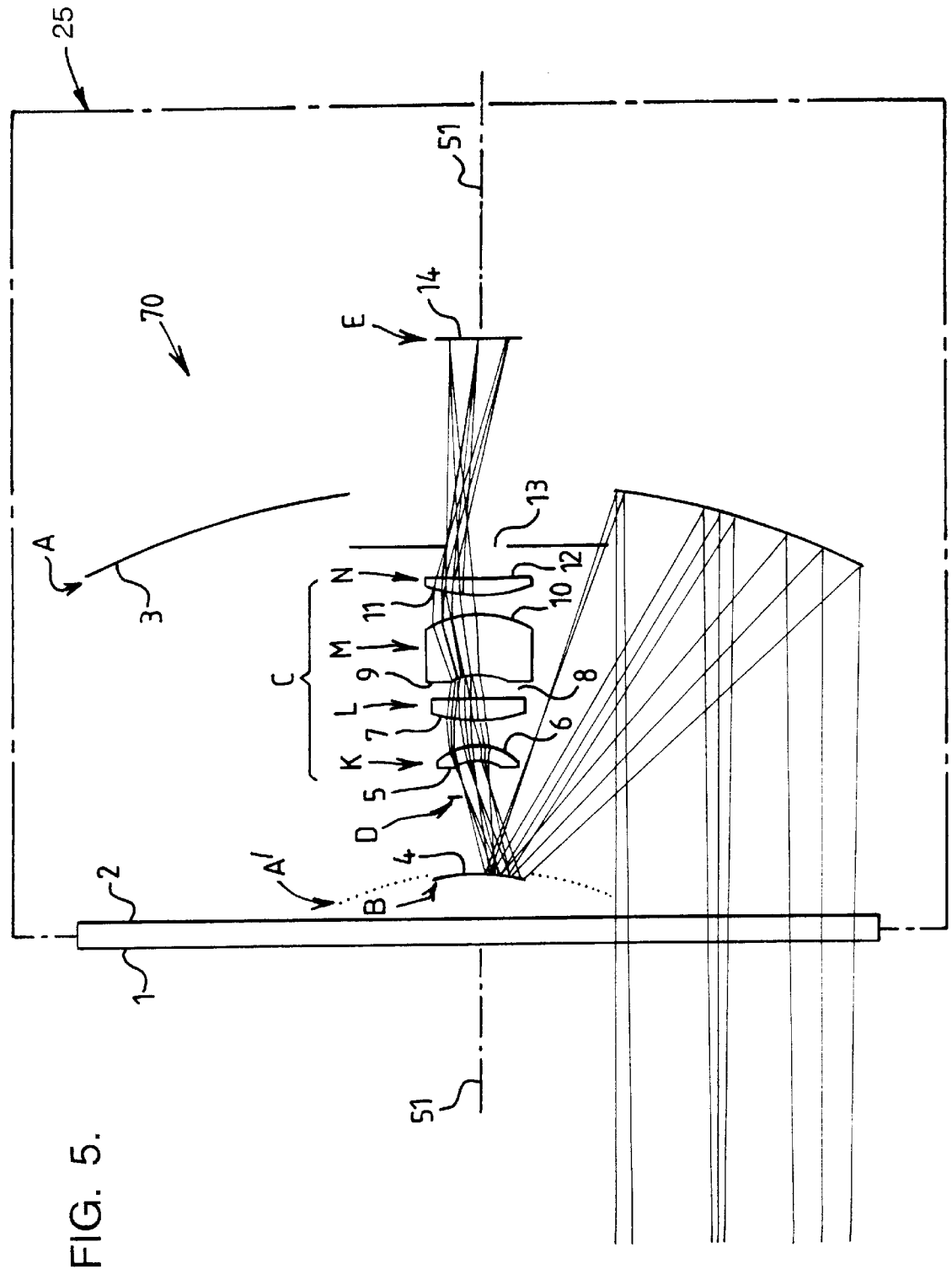
FIG. 5 illustrates a third embodiment which incorporates an unpowered window and a dual field of view system shown in its narrow angle setting.
Figure 6:
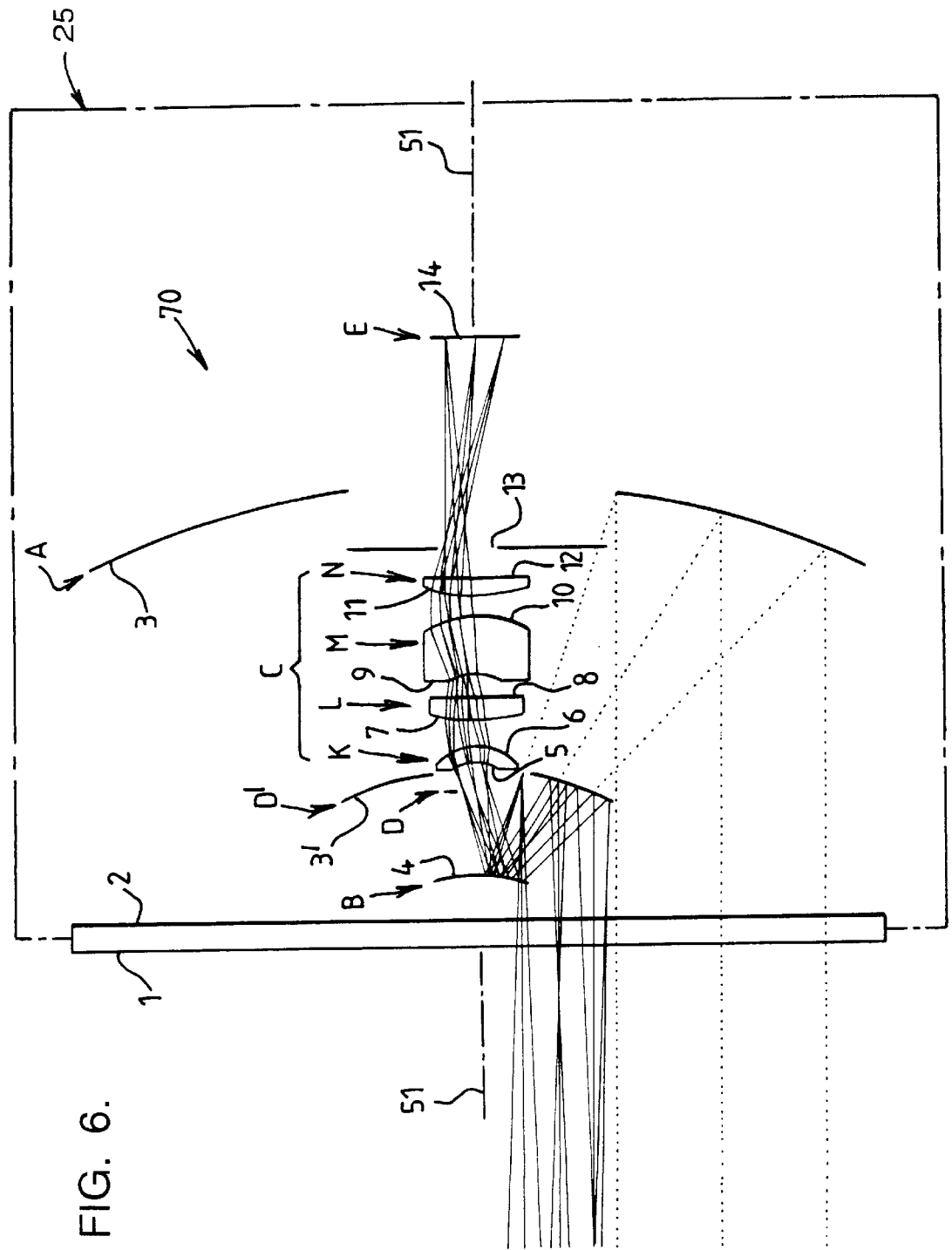
FIG. 6 illustrates the system of FIG. 5 in its wide angle setting.

The system 70 which is illustrated in FIGS. 5 and 6 is generally similar to the system of FIGS. 3 and 4 and utilises a refractive relay lens C but in this case the relay is composed of four lens elements K,L,M and N one of which incorporates a diffractive surface. Lens elements K and M are made of Germanium which has a relatively high γ value whereas lens elements L and N are made of zinc sulphide which has a relatively low γ value. Elements K,L,M and N may be configured to eliminate thermal defocus so as to provide full athermalization with respect to the housing material (not shown) forming the housing of the imaging system and which in this case is aluminium. The diffractive surface is surface 9 formed on lens element M which is made of Germanium and is therefore easy to machine to the required diffractive pattern. The diffractive pattern is arranged for the purpose of eliminating chromatic aberration. A specific functional design for the system 70 is set forth in Table III which is similar in format to Tables I and II and the successive effective surfaces of the elements are identified numerically in FIGS. 5 and 6. It will be noted that the surface numbers of the system 70 are not the same as those of systems 50 or 60.

Figure 7:
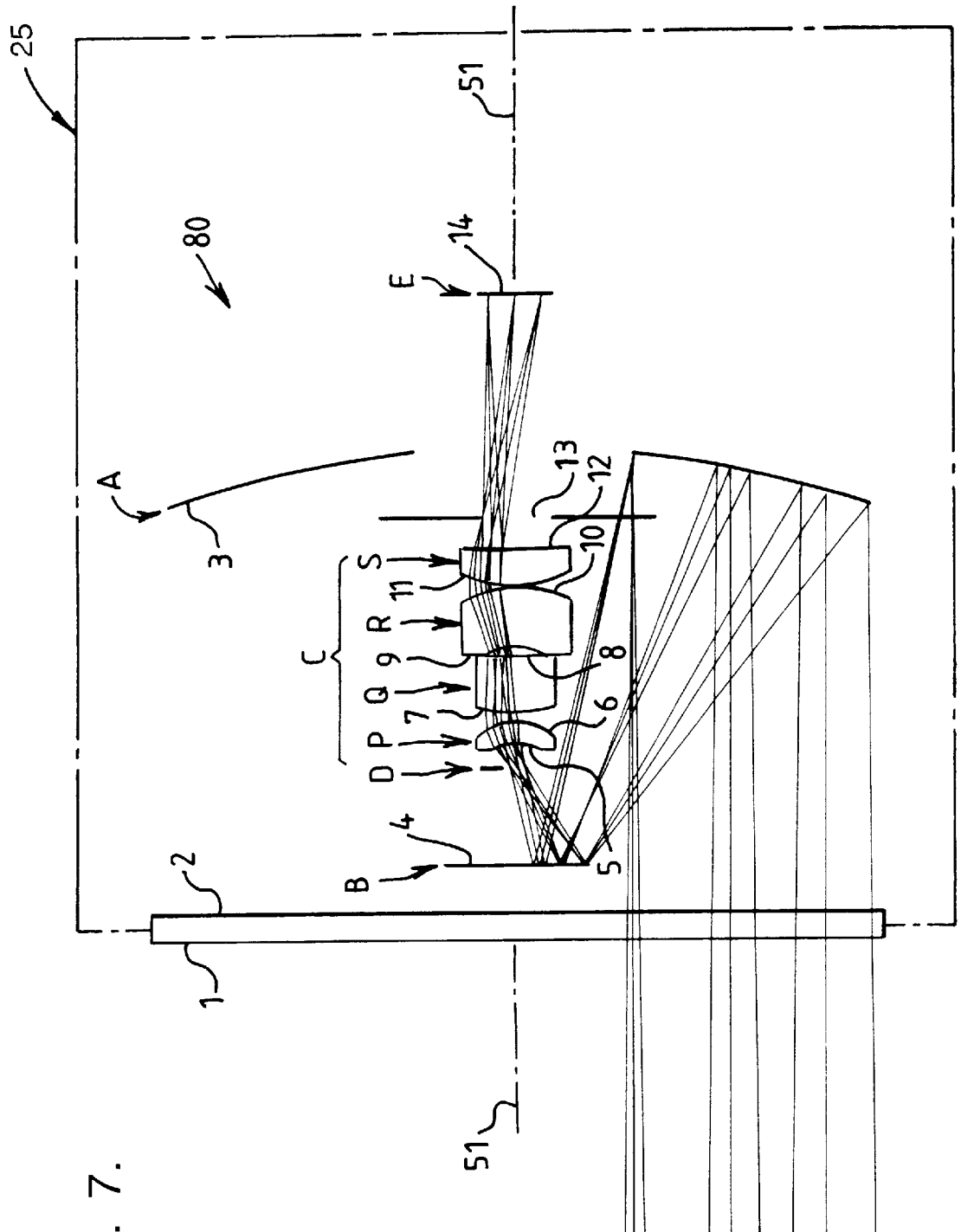
FIG. 7 illustrates a fourth embodiment incorporating an unpowered window and having a single field of view.

The system 80 which is illustrated in FIG. 7 is a single field of view system which omits the movable mirror $A^1$ and has the secondary mirror B with a planar surface. The relay C, however, is a refractive lens incorporating a diffractive surface similar to the system 70. The relay C is formed by elements P,Q,R and S of which P and R are Germanium whilst Q and S are zinc sulphide. R is negatively powered and incorporates the diffractive surface. P,Q and S are positively powered. An almost fully achromatized and athermalized design (relative to aluminium) is set forth in Table IV.

Figure 8:
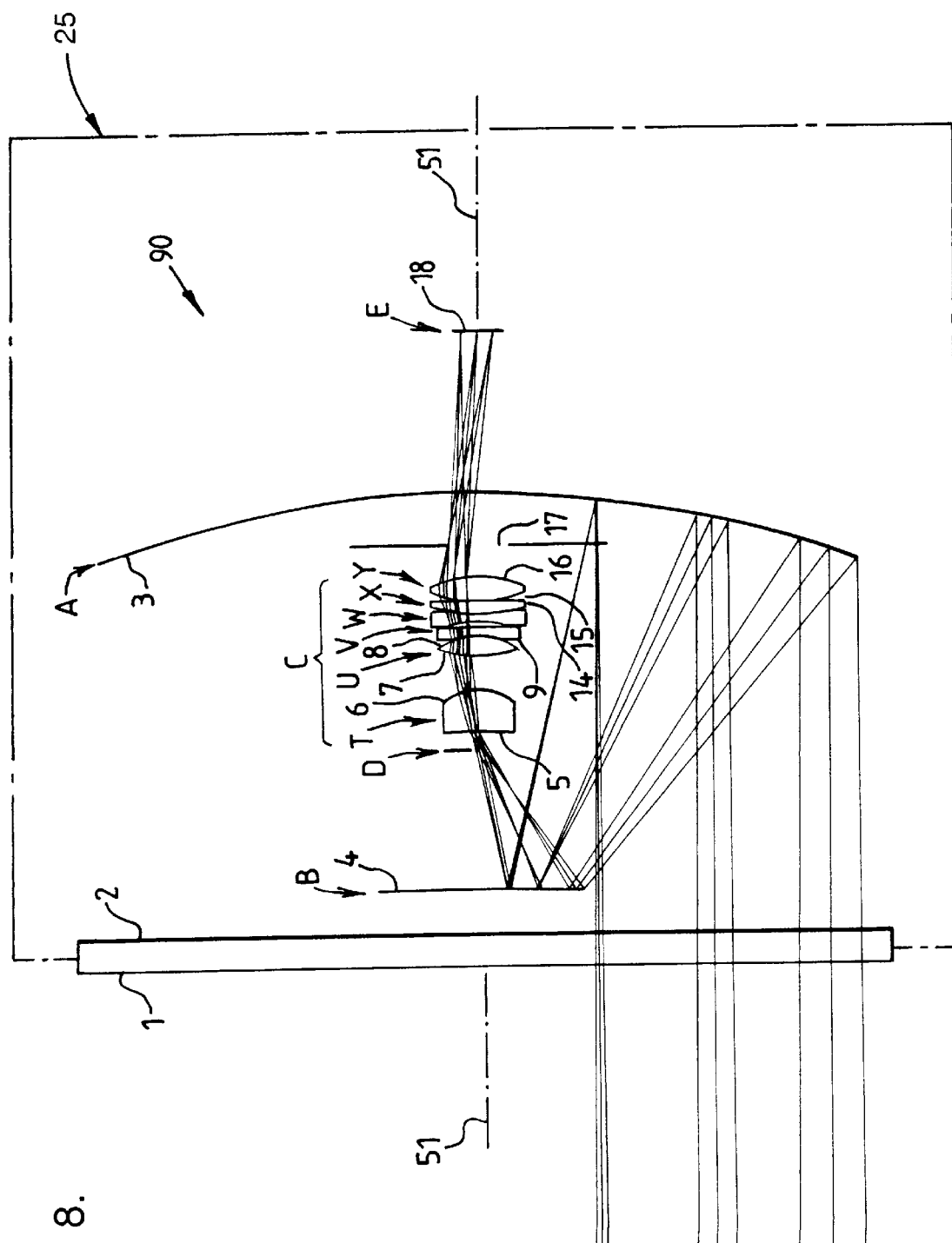
FIG. 8 is a fifth embodiment with an unpowered window and a single field of view.

The system 90 which is illustrated in FIG. 8 is generally similar to system 80 but incorporates a slightly convex secondary mirror B and utilized different materials in the refractive lens C to avoid the use of Germanium thereby enabling the system to operate in both the visible waveband and in the infrared waveband, and to provide for the diffractive surface on a low γ material, zinc sulphide, which is an easily machined material. A fully achromatised and athermalised design (relative to aluminium) is set forth in Table V. In this case the relay C is formed by six lens elements T,U,V,W,X and Y of which V and W are negatively powered. In the interests of clarity surfaces 10,11,12 and 13 are not labelled in FIG. 8. Element V has surfaces 9 and 10; element W has surfaces 11 and 12; element X has surfaces 13 and 14. Surface 14 is the diffractive surface which in this specific embodiment operates in different diffractive orders (a so called 'multi-order diffractive surface') in the visible and in the mid infrared wavebands.

TABLE I

Embodiment 1 with Powered (approx planar) Window
Spectral Bandwidth = VISMIR (0.7–1.0 μm & 3.4–4.2 μm)

| Surface Number | Radius | | Thickness or Separation | Material |
|---|---|---|---|---|
| Narrow Angle (nominal EFL = 100) | | | | |
| 1 | 2186.45 | concave | 1.3431 | Zinc Sulphide Window |
| 2 | Plano | | 19.139 | |

TABLE I-continued

| | | | | |
|---|---|---|---|---|
| 3 | 36.6457* | concave | −17.2597 | Narrow Angle Primary Mirror |
| 4 | 9.56308* | convex | 5.0957 | Secondary Mirror |
| 5 | 175.338 | concave | 0.6952 | Zinc Sulphide Mangin (in transmission) |
| 6 | 70.1792 | concave | 6.7621 | |
| 7 | 13.5190* | concave | −6.7621 | Tertiary Mirror |
| 8 | 70.1792 | convex | −0.6952 | Zinc suphilde Mangin (in reflection - 1st pass) |
| 9 | 175.338 | convex | 0.6952 | Zinc sulphide Mangin (in reflection - 2nd pass) |
| 10 | 70.1792 | convex | 8.3135 | |
| 11 | (Aperture Stop) | | 9.1101 | |
| 12 | (Focal plane) | | | |
| | | | | NB. All zinc sulphide is multispectral |

Wide Angle (EFL approx. ⅓ of Narrow Angle)

| | | | | |
|---|---|---|---|---|
| 3' | 13.2712* | concave | 6.2571 | Wide Angle Primary Mirror |
| | | | −4.3778 | |
| | | | 6.0957 | |

All other data as above
*Aspheric Surfaces

Depth = $c.r^2/(1 + (1 - E.c^2r^2)) + a^4.r^4 + a^6.r^6$ where $c = 1/\text{Radius}$ & $r$ = semi-diameter of the surface

| Surface Number | E | $a^4$ | $a^6$ |
|---|---|---|---|
| 3 (NA) | 9.4580E−01 | 1.9016E−06 | 7.5018E−10 |
| 3' (WA) | 3.8610E−01 | 1.7003E−05 | 1.5583E−08 |
| 4 | 9.8688E+00 | 2.3724E−03 | 1.0930E−04 |
| 7 | −3.9485E+00 | −2.1926E−04 | 1.5289E−06 |

TABLE II

Embodiment 2 with Unpowered Window
Spectral Bandwidth = 8–10 μm

| Surface Number | Radius | | Thickness or Separation | Material |
|---|---|---|---|---|

Narrow Angle (nominal EFL = 100)

| | | | | |
|---|---|---|---|---|
| 1 | Plano | | 1.3254 | Zinc Sulphide Window |
| 2 | Plano | | 18.5555 | |
| 3 | 36.8917* | concave | −16.6867 | Narrow Angle Primary Mirror |
| 4 | 7.11816* | convex | 4.7684 | Secondary Mirror |
| 5 | 9.24405 | convex | 0.5744 | Germanium |
| 6 | 27.218 | concave | 5.004 | |
| 7 | 3.28836* | convex | 1.5663 | Germanium |
| 8 | 3.02011 | concave | 1.3254 | |
| 9 | (Aperture Stop) | | 8.9478 | |
| 10 | (Focal plane) | | | |

Wide Angle (EFL approx. ⅓ of Narrow Angle)

| | | | | |
|---|---|---|---|---|
| 3' | 12.2935* | concave | 6.2565 | Wide Angle Primary Mirror |
| | | | −4.3867 | |
| | | | 4.7684 | |

All other data as above
*Aspheric Surfaces

Depth = $c.r^2/(1 + (1 - E.c^2r^2)) + a^4.r^4 + a^6.r^6$ where $c = 1/\text{Radius}$ & $r$ = semi-diameter of the surface

| Surface Number | E | $a^4$ | $a^6$ |
|---|---|---|---|
| 3 (NA) | −6.1457E−02 | −2.5518E−07 | −9.3500E−11 |
| 3' (WA) | 9.4121E−01 | 5.1975E−05 | 3.6634E−07 |
| 4 | 6.9413E+00 | 1.7897E−03 | 3.1101E−04 |
| 7 | −8.3407E−01 | 4.6758E−03 | 7.4894E−05 |

TABLE III

Spectral Bandwidth = 8–10 μm

| Surface Number | Radius | | Thickness or Separation | Material |
|---|---|---|---|---|

Narrow Angle (nominal EFL = 100)

| | | | | |
|---|---|---|---|---|
| 1 | Plano | | 1.0619 | Zinc Sulphide Window |
| 2 | Plano | | 18.7304 | |
| 3 | 36.9126* | concave | −16.844 | Narrow Angle Primary Mirror |
| 4 | 5.86641* | convex | 4.8139 | Secondary Mirror |
| 5 | 2.26964 | concave | 0.7032 | Germanium |
| 6 | 2.36734 | convex | 1.1001 | |
| 7 | 6.54574 | convex | 0.9569 | Zinc Sulphide |
| 8 | 38.7821 | concave | 1.0298 | |
| 9 | 2.40497*# | concave | 2.5042 | Germanium |
| 10 | 4.51348 | convex | 0.8474 | |
| 11 | 6.24561 | convex | 0.7037 | Zinc Sulphide |
| 12 | 17.8175 | concave | 1.3379 | |
| 13 | (Aperture Stop) | | 9.0322 | |
| 14 | (Focal plane) | | | |

Wide Angle (EFL approx. ⅓ of Narrow Angle)

| | | | | |
|---|---|---|---|---|
| 3' | 12.3042* | concave | 6.4264 | Wide Angle Primary Mirror |
| | | | −4.54 | |
| | | | 4.8139 | |

All other data as above
*Aspheric Surfaces

Depth = $c.r^2/(1 + (1 - E.c^2r^2)) + a^4.r^4 + a^6.r^6$ where $c = 1/\text{Radius}$ & $r$ = semi-diameter of the surface

| Surface Number | E | $a^4$ | $a^6$ |
|---|---|---|---|
| 3 (NA) | −1.0947E−01 | −1.7441E−07 | −8.9522E−11 |
| 3' (WA) | −1.0500E−01 | 0.0000E+00 | −4.0000E−08 |
| 4 | 1.0000E+00 | 4.3234E−03 | −1.9096E−04 |
| 9 | −1.0362E+01 | −7.7400E−02 | 1.6153E−02 |

Diffractive Surfaces
Optical Path Difference = $h^2.r^2 + h^4.r^4 + h^6.r^6 + h^8.r^8$ where $r$ = semi-diameter of the surface

| Surface Number | $h_2$ | $h_4$ | $h_6$ | $h_8$ |
|---|---|---|---|---|
| 9 | −2.5311E.02 | 5.1453E−02 | −8.9908E−02 | 3.9772E−02 |

TABLE IV

Embodiment 4 with Unpowered Window
Spectral Bandwidth = 8–10 μm

| Surface Number | Radius | | Thickness or Separation | Material |
|---|---|---|---|---|

Narrow Angle only (nominal EFL = 100)

| | | | | |
|---|---|---|---|---|
| 1 | Plano | | 1.2763 | Zinc Sulphide Window |
| 2 | Plano | | 22.4933 | |
| 3 | 50.0945* | concave | −20.2279 | Narrow Angle Primary Mirror |
| 4 | Plano | | 5.9083 | Secondary Mirror |
| 5 | 2.8146 | concave | 1.0421 | Germanium |
| 6 | 2.64979 | convex | 0.4949 | |
| 7 | 9.97262 | convex | 2.6904 | Zinc Sulphide |
| 8 | 50.8165 | concave | 0.4854 | |
| 9 | 3.14171*# | concave | 2.9843 | Germanium |

TABLE IV-continued

| | | | | |
|---|---|---|---|---|
| 10 | 5.66395 | convex | 0.189 | |
| 11 | 7.24233 | convex | 1.5189 | Zinc Sulphide |
| 12 | 22.1275 | concave | 1.6067 | |
| 13 | (Aperture Stop) | | 10.8467 | |
| 14 | (Focal plane) | | | |

*Aspheric Surfaces

Depth = $c.r^2/(1 + (1 - E.c^2r^2) + a^4.r^4 + a^6.r^6$ where $c = 1/$Radius & $r = $ semi-diameter of the surface

| Surface Number | E | $a^4$ | $a^6$ |
|---|---|---|---|
| 3 | 3.8915E−01 | 5.1119E−07 | −1.4497E−11 |
| 9 | −1.1722E+01 | −4.8515E−02 | 9.2733E−03 |

Diffractive Surfaces

Optical Path Difference = $h^2.r^2 + h^4.r^4 + h^6.r^6 + h^8.r^8$ where $r = $ semi-diameter of the surface

| Surface Number | $h_2$ | $h_4$ | $h_6$ | $h_8$ |
|---|---|---|---|---|
| 9 | −5.5125E−03 | 1.9367E−05 | −2.3073E−02 | 1.0972E−02 |

TABLE V

Embodiment 5 with Unpowered Window
Spectral Bandwidth = VISMIR (0.7–1.0 μm & 3.4–4.2 μm)

| Surface Number | Radius | | Thickness or Separation | Material |
|---|---|---|---|---|
| Narrow Angle only (nominal EFL = 100) | | | | |
| 1 | Plano | | 1.3334 | Zinc Sulphide Window |
| 2 | Plano | | 18.6682 | |
| 3 | 44.2147* | concave | −16.7881 | Primary Mirror |
| 4 | 110.574 | convex | 6.6672 | Secondary Miror |
| 5 | 4.84471* | concave | 1.7395 | Zinc Sulphide |
| 6 | 2.24757 | convex | 1.4666 | |
| 7 | 6.51266 | convex | 0.778 | Zinc Sulphide |
| 8 | 3.03058* | convex | 0.0529 | |
| 9 | 2.67273 | concave | 0.3259 | Zinc Selenide |
| 10 | 33.1286 | concave | 0.2056 | |
| 11 | 6.95622 | concave | 0.3767 | Zinc Selenide |
| 12 | 8.42897 | concave | 0.0653 | |
| 13 | 10.5124 | convex | 0.4028 | Zinc Sulphide |
| 14 | 116.427*# | concave | 0.0707 | |
| 15 | 5.26616 | convex | 1.0168 | Silver Chloride |
| 16 | 5.09594 | convex | 1.3334 | |
| 17 | (Aperture Stop) | | | |
| 18 | (Focal plane) | | | |

NV, All zinc sulphide is multispectral

*Aspheric Surfaces

Depth = $c.r^2/(1 + (1 - E.c^2r^2) + a^4.r^4 + a^6.r^6$ where $c = 1/$Radius & $r = $ semi-diameter of the surface

| Surface Number | E | $a^4$ | $a^6$ |
|---|---|---|---|
| 3 | −3.7544E+00 | −5.0502E−06 | 3.4550E−09 |
| 5 | 1.0000E+00 | −2.3812E−02 | 0.0000E+00 |
| 8 | 2.0901E+00 | 3.0434E−03 | 2.3636E−03 |
| 14 | 1.0000E+00 | 7.8789E−04 | −5.6818E−04 |

Diffractive Surfaces

Optical Path Difference = $h^2.r^2 + h^4.r^4 + h^6.r^6 + h^8.r^8$ where $r = $ semi-diameter of the surface

| Surface Number | $h_2$ | $h_4$ | $h_6$ | $h_8$ |
|---|---|---|---|---|
| 14 | −3.4499E−03 | −1.5020E−04 | 0.0000E+00 | 0.0000E+00 |

What is claimed is:

1. An optical imaging system for forming an image to a focal plane, and comprising an objective and an image relay aligned on a common optical axis, the objective being arranged to form an intermediate image at which a field stop is located, and wherein the objective is formed by a large concave primary mirror which is apertured on-axis and a small secondary mirror generally disposed in the form of a Cassegrain objective, and the image relay is arranged to relay the intermediate image to the focal plane and is formed by a pair of confronting mirrors each being apertured on-axis to enable radiation to pass into and out of the relay.

2. An optical imaging system as claimed in claim 1, wherein the system is rendered dual field by an introduction of an axially movably alternative concave primary mirror which is apertured on-axis but which is of smaller diameter than the said large concave primary mirror, the alternative primary mirror being moveable between an out-of-use position which is generally aligned with the small secondary mirror of the objective and an in-use position intermediate the large concave primary mirror and the secondary concave mirror where it has the dual function of (i) co-operating with the secondary mirror to form a wide angle objective and (ii) blocking radiation directed from the large concave primary mirror.

3. An optical imaging system comprising an objective and a relay aligned on a common optical axis, the objective being arranged to form an intermediate image at which a field stop is located, and wherein the objective is formed by a large concave primary mirror which is apertured on-axis and a small secondary mirror generally disposed in the form of a Cassegrain objective, the relay is formed by a refracting lens, and the system is rendered dual field by an introduction of an axially-moveable alternative concave primary mirror which is apertured on-axis but which is of smaller diameter than the said large concave primary mirror, the alternative primary mirror being moveable between an out-of-use position which is generally aligned with the small secondary mirror of the objective and an in-use position intermediate the large concave primary mirror and the secondary mirror where it has the dual function of (i) co-operating with the secondary mirror to form a wide angle objective and (ii) blocking radiation directed from the large concave primary mirror.

4. An optical imaging system mounted in a housing and comprising an objective and a relay aligned on a common optical axis, the objective being arranged to form an intermediate image at which a field stop is located, and wherein the objective is formed by a large concave primary mirror which is apertured on-axis and a small secondary mirror generally disposed in the form of a Cassegrain objective, and the relay is formed by a plurality of refractive lens elements including one lens element which is positively powered and has a relatively low Y value (Y being the thermal 'glass' constant), and another lens element which incorporates a diffractive surface and which is negatively powered and has a relatively high Y value whereby the relay is essentially fully achromatised and is athermalised with respect to the housing of the imaging system.

5. An optical imaging system comprising an objective and a relay aligned on a common optical axis, the objective being arranged to form an intermediate image at which a field stop is located and wherein the objective is formed by a large concave primary mirror which is apertured on-axis and a small secondary mirror generally disposed in the form of a Cassegrain objective, and the relay is formed by a plurality of refractive lens elements, where the system is rendered dual field by the introduction by an axially moveable alternative concave primary mirror which is apertured on-axis but which is of smaller diameter than the said large concave primary mirror, the alternative primary mirror being moveable between an out-of-use position which is generally aligned with the small secondary mirror of the objective and an in-use position intermediate the large concave primary mirror and the secondary mirror where it has the dual function of (I) co-operating with the secondary mirror to form a wide angle objective and (ii) blocking radiation directed from the large concave primary mirror.

6. An optical imaging system for forming an image to a focal plane, and comprising an objective and an image relay aligned on a common optical axis, the objective being arranged to form an intermediate image at which a field stop is located, and wherein the objective is formed by a large concave primary mirror which is apertured on-axis and a small secondary mirror generally disposed in the form of a Cassegrain objective, and the image relay is arranged to relay the intermediate image to the focal plane being located axially between the mirrors of the Cassegrain objective and being formed by a pair of confronting mirrors each apertured on-axis to enable radiation to pass into and out of the relay, wherein the system is rendered dual field by an introduction of an axially moveably alternative concave primary mirror which is apertured on-axis but which is of smaller diameter than the said large concave primary mirror, the alternative primary mirror being moveable between an out-of-use position which is generally aligned with the small secondary mirror of the objective and an in-use position intermediate the large concave primary mirror and the secondary concave mirror where it has the dual function of (i) co-operating with the secondary mirror to form a wide angle objective and (ii) blocking radiation directed from the large concave primary mirror.

* * * * *

UNITED STATES PATENT AND TRADEMARK OFFICE
CERTIFICATE OF CORRECTION

PATENT NO. : 6,118,583

DATED : September 12, 2000

INVENTOR(S) : Rogers

It is certified that error appears in the above-identified patent and that said Letters Patent is hereby corrected as shown below:

Column 7:

Table I, Surface Number 4, "9.56308*" should read --9.55308*-- and "5.0957" should read --6.0957--; Surface Number 8, "suphilde" should read --sulphide--.

Table II, Surface Number 3', "6.2565" should read --6.2555--; Surface Number 3' (WA), "3.6634E-07" should read --3.6534E-07--.

Column 8:

Table IV, Surface Number 1, "1.2763" should read --1.2753--; Surface Number 7, "2.6904" should read --2.5904--.

Column 9:

Table V, Surface Number 4, "Miror" should read --Mirror--; Surface Number 7, "0.778" should read --0.7778--; Surface Number 14, "116.427*#" should read --115.427*#--; Surface Number 17, under the column labeled "Thickness or Separation" insert --9.1058--.

Table V, under "*Aspheric Surfaces", Surface Number 8, "2.3636E-03" should read --2.3635E-03--; Surface Number 14, "-5.6818E-04" should read ---6.6818E-04--.

UNITED STATES PATENT AND TRADEMARK OFFICE
CERTIFICATE OF CORRECTION

PATENT NO. : 6,118,583
DATED : September 12, 2000
INVENTOR(S) : Rogers

It is certified that error appears in the above-identified patent and that said Letters Patent is hereby corrected as shown below:

Column 10:
line 14, "an" should read --the--; line 15, "movably" should read --moveable--; line 34, "axially-moveable" should read --axially moveable--.

Signed and Sealed this

Twenty-fourth Day of April, 2001

Attest:

NICHOLAS P. GODICI

Attesting Officer      Acting Director of the United States Patent and Trademark Office